(12) United States Patent
Patnude

(10) Patent No.: US 10,651,782 B2
(45) Date of Patent: May 12, 2020

(54) BALLASTED TRACKER DRIVE ASSEMBLY

(71) Applicant: SolarCity Corporation, San Mateo, CA (US)

(72) Inventor: Gregory Philip Patnude, San Rafael, CA (US)

(73) Assignee: SolarCity Corporation, San Mateo, CA (US)

(*) Notice: Subject to any disclaimer, the term of this patent is extended or adjusted under 35 U.S.C. 154(b) by 390 days.

(21) Appl. No.: 15/199,887

(22) Filed: Jun. 30, 2016

(65) Prior Publication Data
US 2018/0006597 A1 Jan. 4, 2018

(51) Int. Cl.
*H02S 20/32* (2014.01)
*F24S 30/425* (2018.01)
*F24S 25/10* (2018.01)
*F24S 30/00* (2018.01)

(52) U.S. Cl.
CPC .............. *H02S 20/32* (2014.12); *F24S 25/10* (2018.05); *F24S 30/425* (2018.05); *F24S 2030/18* (2018.05)

(58) Field of Classification Search
CPC ........ F24J 2/5417; F24J 2/5424; F24J 2/5427; F24J 2/54; H01L 31/045; F24S 2030/18; F24S 2030/10; F24S 2030/11; F24S 2030/134; F24S 30/40; F24S 30/42–30/425; H02S 20/30; H02S 20/32
USPC .......... 136/246, 248, 251; 250/203.1, 203.4; 126/571, 573, 576, 577, 600, 605, 606, 126/607, 683, 685, 696, 698, 700; 52/126.1, 126.7, 126.6, 126.5
See application file for complete search history.

(56) References Cited

U.S. PATENT DOCUMENTS

| 4,429,178 | A | 1/1984 | Prideaux et al. |
| 4,628,142 | A | 12/1986 | Hashizume |
| 7,968,791 | B2 | 6/2011 | Do et al. |
| 8,273,978 | B2 | 9/2012 | Thompson et al. |
| 8,466,399 | B1 | 6/2013 | Sherman |

(Continued)

FOREIGN PATENT DOCUMENTS

| EP | 2520875 A1 | * | 11/2012 | .............. F24S 40/85 |
| JP | 08130322 A | * | 5/1996 | .............. F24J 2/541 |
| KR | 20100137871 A | * | 12/2010 | ............ F24S 30/425 |

OTHER PUBLICATIONS

Machine translation of JP H08-130322A.*

(Continued)

*Primary Examiner* — Eric R Smith
(74) *Attorney, Agent, or Firm* — Dentons US LLP

(57) ABSTRACT

PV modules and ballast arm assemblies are mounted onto a torque tube suspended from a support structure. The support structures allows torque tube, and mounted PV modules and ballast arm assemblies, to freely rotate. The ballast arm assembly includes a drive mechanism, an arm and a ballast. The drive mechanism allows the adjustment angle between the PV module and the arm and ballast to be changed. Changing the adjustment angle causes the torque tube, and mounted PV modules, to freely rotate to a different orientation angle in order to balance the moments of PV modules and ballast arm assemblies caused by gravity. The orientation angle can be changed throughout the day by changing the adjustment angle in order for the PV modules to track the sun.

12 Claims, 9 Drawing Sheets

(56) References Cited

U.S. PATENT DOCUMENTS

| | | |
|---|---|---|
| 8,835,747 B2 | 9/2014 | Miller et al. |
| 9,074,795 B2 | 7/2015 | Vander Mey et al. |
| 2005/0284467 A1* | 12/2005 | Patterson .............. G01S 3/7861 126/580 |
| 2007/0089778 A1* | 4/2007 | Horne ................... H01L 31/052 136/246 |
| 2010/0051086 A1 | 3/2010 | Keshner et al. |
| 2010/0101630 A1* | 4/2010 | Kats ........................ H02S 20/32 136/246 |
| 2011/0023940 A1* | 2/2011 | Do ......................... H02S 20/00 136/246 |
| 2011/0186040 A1* | 8/2011 | Liao ....................... F24S 25/12 126/571 |
| 2013/0056000 A1* | 3/2013 | Perrin .................... F24S 40/80 126/606 |
| 2014/0338659 A1 | 11/2014 | Corio |
| 2015/0000722 A1 | 1/2015 | Au |
| 2015/0082924 A1 | 3/2015 | Morgan |
| 2015/0214885 A1 | 7/2015 | Wu |
| 2015/0303864 A1 | 10/2015 | Gonzalez Moreno |
| 2015/0372636 A1 | 12/2015 | Menard |
| 2016/0013751 A1 | 1/2016 | Michotte De Welle et al. |
| 2016/0056755 A1 | 2/2016 | Abiko et al. |
| 2016/0065123 A1 | 3/2016 | Hayes et al. |

OTHER PUBLICATIONS

Machine translation of KR 20100137871A.*
LinguaLinx Language Solutions, Inc., Translation of KR1020100137871A.*
Alexandru, C. et al., "Optimal Design of the Solar Tracker Used for a Photovoltaic String," Journal of Renewable and Sustainable Energy, vol. 5, Issue 2, Mar. 2013, United States, Abstract only, 2 pages.

* cited by examiner

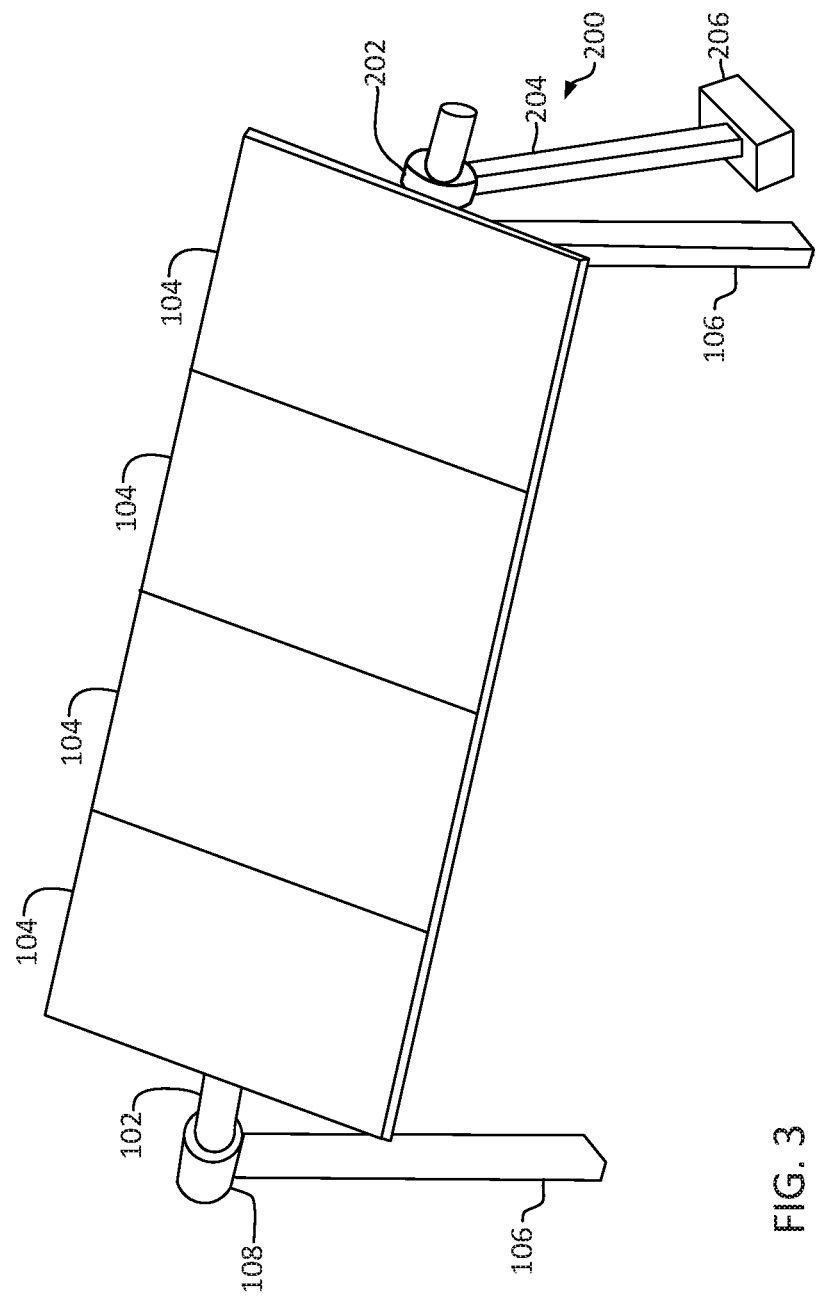

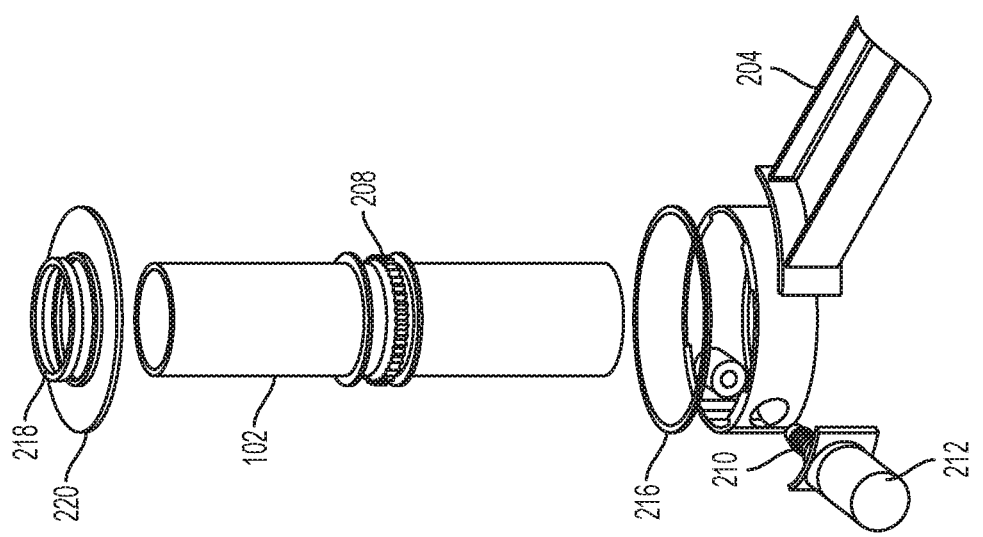

BALLASTED TRACKER DRIVE ASSEMBLY

TECHNICAL FIELD

The present invention relates to positioning photovoltaic modules of a photovoltaic tracker array.

BACKGROUND OF THE INVENTION

Photovoltaic modules, herein after PV modules, generate the most energy when oriented directly towards the sun. As the sun moves across the sky throughout the day, PV modules must be reoriented to keep them on the sun, in order to optimally generate energy.

Solar trackers are used to rotate photovoltaic (PV) modules to keep them perpendicular to the direct rays of the sun. Keeping the PV modules, as part of an array, at this orientation increases and ideally optimizes the amount of energy that can be generated by the array, because energy generated by the array drops off with the cosine of the angle of incidence of solar rays on the surface of the array.

In conventional single-axis trackers, PV modules are suspended above the ground in one or more horizontal rows, connected to a beam known as a torque tube. The torque tube, generally oriented along a North-South axis, is attached to a drive mechanism affixed to a support structure and actuated to incrementally rotate the photovoltaic array in place over the course of the day to maintain a relatively constant angle with the sun as the sun progresses westwardly through the sky.

Fixing PV modules in place with the driving mechanism make the support structures and torque tubes associated with the PV modules substantially more susceptible to wind damage. As the wind pushes on each PV module, each PV module applies torsion to the torque tube, and the additive forces tend to twist the torque tube along its main axis because at least one portion of torque tube is prevented from rotating due to the drive mechanism. Further, depending on the angle of the PV modules with respect to the wind flow, some wind conditions can cause damage by inducing oscillations in the torque tube assembly via forces applied to the PV modules. Consequently, preventing twisting of the torque tube in varying wind conditions is desirable to avoid maintenance and repair of the array.

Limiting maintenance is important because the viability of the array is based on the projected rate of return derived from comparing the fixed value of the energy generated over the lifetime of the system versus the costs of manufacture, installation and maintenance. In a multi-megawatt project, cost reductions of pennies per watt can be the difference between a project being viable or too expensive. Therefore, tracker designers are always seeking innovations to lower installation, hardware, and maintenance costs.

Accordingly, there remains a need for photovoltaic tracker mechanisms that allow for reducing maintenance and that are more efficient and cost effective.

BRIEF SUMMARY OF THE INVENTION

In various aspects, the present disclosure provides for: ballast arm assemblies, a section of a photovoltaic array including a ballast arm assembly, and a method for rotating a section of photovoltaic array using a ballast arm drive assembly.

Various embodiments of the invention provide new and improved methods and systems for positioning PV modules attached to a torque tube of a solar tracker. Various embodiments will reduce costs of hardware and maintenance over conventional methods and systems. These and other embodiments are shown and discussed in greater detail in the figures and corresponding detailed description.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

FIG. 3 shows a perspective view of a section of an exemplary solar-tracking photovoltaic array according to embodiments of the invention.

FIGS. 4A-C show detailed views of an exemplary ballast arm assembly according to embodiments of the invention.

DETAILED DESCRIPTION OF THE INVENTION

Figure 1:
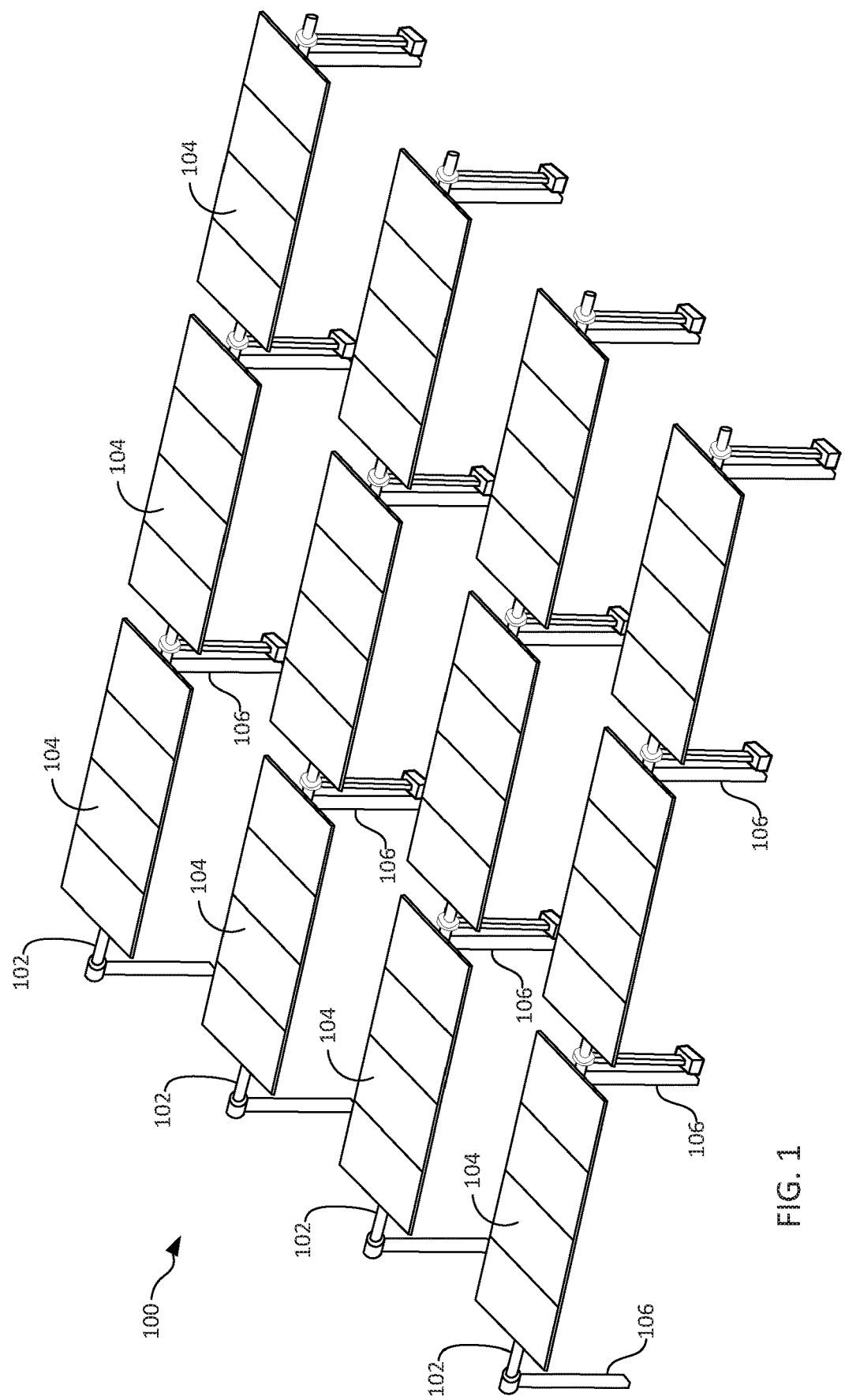
FIG. 1 shows an exemplary solar-tracking photovoltaic array according to embodiments of the invention.

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

Solar arrays that track the daily movement of the sun typically include one or more rows of PV modules, that are attached to contiguous sections of pipe, referred to as a torque tube. A drive motor assembly rotates the torque tube in accordance with a predetermined algorithm to keep the attached PV modules "on sun", in other words substantially perpendicular to direct solar radiation. These types of solar trackers are referred to as single axis trackers arrays. Single axis tracker arrays may include a drive motor for each torque tube or a single drive assembly may rotate several torque tubes at once. Spacing between rows of torque tubes is sometimes necessary to allow the PV modules to freely rotate without interference from PV modules in adjacent rows and also to prevent inter-row shading.

The drive motor assembly is configured to rotate a torque tube supporting a row of solar panels. Torque tube can undergo substantial amounts of twist during periods of strong winds. The forces applied by the wind can have multiple characteristics. The first characteristic is associated with the force imparted by the steady state wind velocity incident to the PV modules. In general, greater angles of the PV module with respect to the ground cause larger amounts of force to be imparted by the wind. This characteristic can place a large steady amount of torque on the torque tube in the direction of the prevailing wind. The second characteristic relates to dynamic forces generated by the wind that can take the form of vortex shedding. When PV modules are angled with respect to the flow of the wind, the planar shape of PV modules can form a wing type structure. As the wind flows past the leading and trailing edges of the PV modules, alternating low-pressure vortices are created along the surface of PV modules facing away from the flow of wind. These low-pressure vortices can induce oscillatory motion in PV modules that can cause fatigue and eventual failure of torque tubes in some configurations, in particular if the frequency of vortex shedding matches the resonance frequency of the array.

Therefore it is beneficial to position PV modules attached to torque tubes in a way that limits damage caused by wind and therefore limits required maintenance to repair wind damage. The present disclosure includes ballast arm assemblies used for rotating a torque tube with attached PV modules to a desired orientation angled. The torque tube freely rotates and therefore twisting stress caused by wind is limited.

These and other embodiments are discussed below with reference to FIGS. 1-7, however, those skilled in the art will readily appreciate that the detailed description given herein with respect to these figures is for explanatory purposes only and should not be construed as limiting.

FIG. 1 shows photovoltaic array 100 including a plurality of rows, in this example four rows are shown, however in embodiments photovoltaic array may include any number of rows. Each row may include one or more torque tubes 102 oriented in series in the direction of the row. Each torque tube 102 may include a plurality of PV modules 104 attached to it. As shown, torque tubes 102 in a row are supported above the ground by a plurality support columns 106 arranged periodically along the row.

In general, rows of an array are oriented in a North/South direction, so that PV modules can track the sun's progress from East to West by rotating about an axis of rotation of torque tubes. For ease of explanation, North/South orientation of rows will be used herein to describe relative directions and portions of the array and component thereof. For example, PV modules include a side generally on the east side of torque tube and a side generally on the west side torque tube. However, the North/South orientation is provided as a non-limiting example and an array or any component thereof can be oriented in other orientations without departing from the scope of the technology disclosed.

Figure 2:
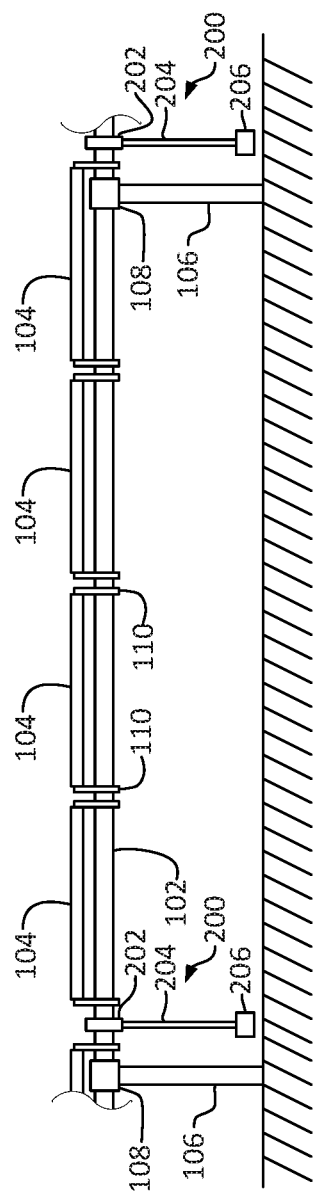
FIG. 2 shows a side view of a section of an exemplary solar-tracking photovoltaic array according to embodiments of the invention.

FIGS. 2 and 3 show portions of an array including torque tube 102 with a plurality of PV modules 104 distributed along the length of torque tube. Torque tube 102 is supported above the ground in a generally horizontal manner on support columns 106. The height that torque tubes are suspended above the ground may be based on the size of PV modules 104. In embodiments, torque tube 102 can be any length and further can include any number of PV modules 104. Support columns 106 are spaced along torque tube to adequately support weight of torque tube 102 and PV modules 104. For example, as shown in FIGS. 2 and 3, a section of torque tube 102, including four PV modules 104, are supported between two support columns 106.

PV modules 104 include top sides, which can include PV cells configured to face the sun to absorb photons and conduct current, and bottom sides, opposite top sides, which when installed in a PV array face the torque tube and can include power distribution elements (Not Shown). PV modules 104 can be rectangular, having a long edge and a short edge, and as considered herein, PV modules can be rectangular modules as known in the industry, including but not limited to, 60-cell PV modules, 72-cell PV modules, 80-cell PV modules, 96-cell PV modules, and the like. Generally, for any given photovoltaic array section, PV modules will be the same size, operate at the same voltage, and generate the same amount of power, such that no individual PV module of photovoltaic array section becomes an operational drag on the other PV modules.

In embodiments a row of array 100 may include one torque tube 102, or a plurality torque tubes 102 each forming a section of the row. In embodiments including rows with a plurality of torque tubes, adjacent torque tubes 102 may be supported by common support columns 106, or each torque tube 102 in a row may have dedicated support columns 106 not used by other torque tubes in the row. In embodiments, torque tube 102 may be a single piece of material, or it may include multiple sections affixed together with splicing sections and function as a body.

Support columns 106 may be configured to support torque tubes 102, and attached PV modules 104, above the ground without restraining rotation of torque tube 102. In some embodiments, support columns can include bearings 108 that allow for free rotation with reduced friction. Each bearing 108 and associated support column 106 helps to support the weight of a portion of torque tube 102 and PV modules 104 without preventing torque tube 102 from rotating to achieve desirable orientation angles of PV modules 104 for collecting sunlight. Bearings 108 can take the form of a closed circular bearing that constrains deflection of a portion of torque tube 102 in any direction or an open bearing functioning primarily to support a portion of torque tube 102 above the ground. In embodiments support structures do not include mechanisms which limit rotation of support torque tube, or mechanism used to position torque tube at a specific location, for example a drive motor assembly affixed to support structure or a brake as may be found in conventional systems.

As shown in FIGS. 2 and 3, PV modules 104 are mounted to a section of torque tube 102 between two support columns 106. In embodiments, PV modules 104 are affixed to torque tube 102 with brackets 110 affixed to opposite sides of frames of PV modules 104. In embodiments PV modules may be attached to the torque tube with a variety of methods, for example; brackets riveted to PV module which are clamped to the torque tube; brackets riveted to the torque tube which are clamped to PV module; or brackets clamped to the torque tube and clamped to PV module. In embodiments, torque tube 102 can include attachment features, such as receiving holes along the length of torque tube, for attaching PV module mounting hardware. Other methods may be used which affix PV module to torque tube so that rotation of torque tube causes PV modules to rotate.

As shown in FIG. 2, in embodiments PV modules can be separated by small gaps. In other embodiments PV modules can be in direct contact with adjacent PV modules, or in direct contact with mounting hardware of adjacent PV modules. When PV modules are arranged without gaps, turbulence caused by wind passing between PV modules can be avoided. However, it is also advantageous to provide some gap in order to allow for expansion of PV modules due to heat expansion.

As shown in FIGS. 2 and 3, ballast arm assemblies 200 are mounted to torque tube 102. Ballast arm assemblies 200 include drive mechanism 202, arm 204 and ballast 206. Ballast arm assemblies 200 may be mounted on portions of torque tube 102 not occupied by PV modules 104. However in embodiments, ballast arm assemblies 200 can be mounted to torque tube 102 on a section of torque tube 102 occupied by PV modules 104 so that a portion of ballast arm assembly 200 is located between torque tube 102 and PV module 104. This configuration has the advantage of not using additional real-estate of torque tube 102 allowing for more PV modules 104 to be mounted for a given length of torque tube. Further, this configuration provides additional protection of drive mechanism from the elements, for example rain.

Ballast 206 is supported by arm 204 to be suspended above the ground when arm 204 is oriented in a downward vertical direction, as is shown in FIG. 2. The length of arm 204 and weight of ballast 206 may be selected based on environmental conditions, e.g. wind speeds, common to the location of array. In embodiments, it has been discovered that an arm length of 48 inches and a ballast weight of 150 lbf per PV module performs well. However, in embodiments, other lengths and weights may be used, for example an arm length between 12 inches and 120 inches, and a ballast weight of 25 lbf to 300 lbf per PV module may be used. FIG. 2 shows one ballast arm assembly 200 for four PV modules. However, in embodiments, torque tube may include any ratio of ballast arm assemblies to PV modules.

Figure 4B:
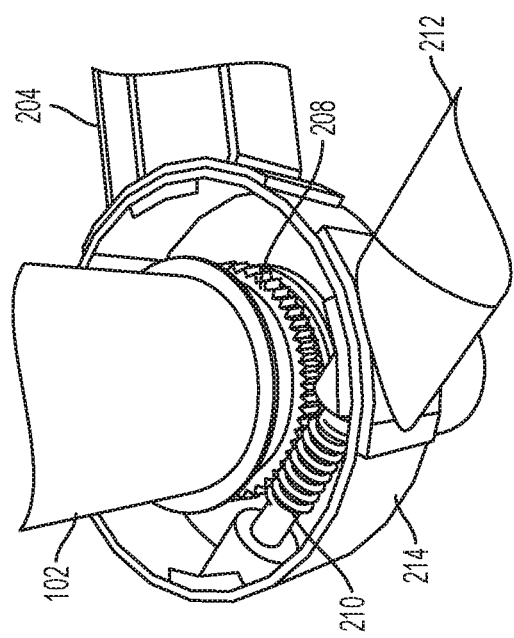
Figure 4A:
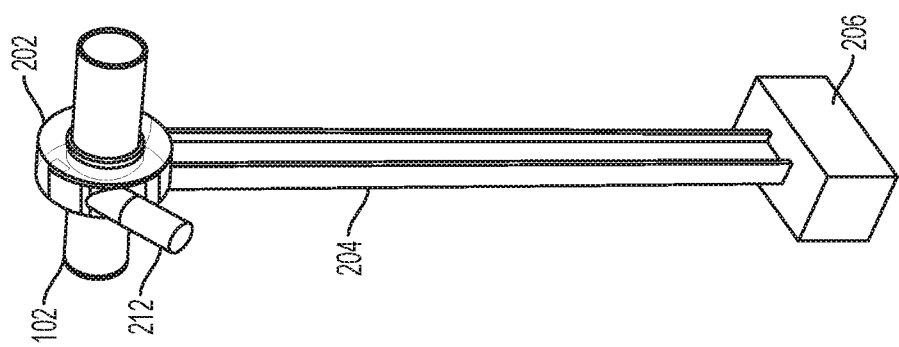

In embodiments, drive mechanism 202 includes a worm drive mechanism. FIGS. 4A-C show in detail worm drive assembly. As shown, drive mechanism 202 is attached to torque tube 102, and includes a worm drive mechanism. Worm drive mechanism, of drive mechanism 202, includes worm wheel 208 rotationally affixed to torque tube 102, worm screw 210 meshed with worm wheel 208, adjustment motor 212 affixed to worm screw 210 and configured to rotate worm screw 210, and arm housing 214 affixed to adjustment motor 212 and affixed to arm 204. Drive mechanism 202 allows for ballast arm assembly 200 to rotate relative to torque tube 102, and therefore to rotate relative to attached PV modules 104. As shown in exploded view of FIG. 4C, components of drive mechanism 202 may be protected from elements with gaskets 216 and 218, and housing plate 220, which seal internal compartment of arm housing 214, worm screw 210, worm wheel 208, and portion of torque tube 102.

As shown, worm wheel 208 is affixed to torque tube 102. In embodiments sections of torque tube including worm wheels may be formed separately to include worm wheels. Section with worm wheels may be spliced between two other sections of torque tube 102. In embodiments, a section of the torque tube may include a plurality of worm wheels corresponding to a plurality of drive assemblies mounted on the torque tube. In embodiments worm wheel 208 may be composed of a plurality of pieces that are affixed to torque tube 102 to form a complete worm wheel around the entire circumference of the torque tube. In embodiments, worm wheel 208 may include gear teeth on only a portion of circumference of torque tube 102, for example 270 degrees.

Worm gear drive mechanisms are advantageous due to their single direction of transmission. Specifically, rotating a worm screw as an input moves the worm wheel, however rotating the worm wheel as an input does not move the worm screw because of high friction caused by the large reduction ratio. This is advantageous because the worm screw is always the input gear and worm wheel always the output gear. Therefore, without actively powering an adjustment motor to turn the worm screw, the angle between the PV modules and the arm is set without providing any power to the motor. Such a drive mechanism including a worm drive mechanism may therefore be considered self-locking.

In embodiments, the worm gear may be affixed to the arm, and the worm screw and adjustment motor may be affixed to the torque tube. In embodiments, drive mechanisms other than worm gear drive mechanisms may be used, such as, for example, other gear mechanisms, chain drive mechanisms, belt drive mechanisms, and direct drive mechanisms. In embodiments, the drive mechanism may include a locking mechanism. In embodiments, the locking mechanism does not require power to remain in a locked or unlocked configuration. In embodiments, the locking mechanism can take the form of a disc break affixed to the torque tube. Such a disc brake can be configured to engage during times when the adjustment motor is not actively rotating the arm relative to the torque tube.

As shown in FIGS. 2 and 3, ballast 206 is located at the end of arm 204. Ballast 206 may be formed in a plurality of different ways. For example, in embodiments ballast 206 may be a vessel that is configured to receive earth, rocks, water, or other media from the installation site. This configuration saves costs in material, manufacture and shipping. Further, this configuration allows on site tuning of the weight of the ballast and allows for variations of ballast weight in different locations along the array. In embodiments, ballast 206 may be a block of concrete, cement, metal, or composite cast around end of arm 204. The end of the arm may include features designed to securely mate with the casting. Casting of ballast 206 may be done prior to arm 204 arriving at the installation site, or at the installation site. In embodiments, ballast 206 may be formed in a shape which minimizes environmental loading on arm, for example in an aerodynamic shape such as an spheroid.

As shown in FIG. 2, ballast arm assemblies 200 are located on portions of torque tube 102 not occupied by PV modules 104. In embodiments, ballast arm assemblies 200 can rotate to any position so that arm 204 is oriented in any direction relative to torque tube 102. In embodiments, the limiting factor for range of rotation of ballast arm assembly relative to torque tube may be electrical connections that supply electricity to adjustment motor and transmit electricity generated by PV modules. In embodiments, electrical connections may include sliding contacts in place of solid wires to allow unlimited rotation of ballast arm assembly and torque tube.

In embodiments, wiring for adjustment motor and/or PV modules may be placed within torque tube in order to protect the wiring from the elements. The wiring for adjustment motors may come out the end of torque tubes and be connected to a controller. In some embodiments without sliding contacts, wiring is provided with sufficient slack and flexibility allowing for a 180-degree range of motion for torque tube so that PV modules may be rotated from vertical facing east to vertical facing west.

FIG. 2 shows PV modules 104 in a horizontal orientation relative to gravity, also referred to herein as the stowed configuration or 0-degree orientation because surface of PV module is at a 0 degree angle relative to horizontal. Further, FIG. 2 shows arms 204 in a vertical orientation, and positioned 90-degrees relative to surface of PV modules 104. It is advantageous for arms 204 to be as long as possible. Therefore, the length of arms 204 may correspond to the height torque tube 102 is suspended above the ground on support columns 106. In embodiments, the height of the support columns is based on the size of the PV modules affixed to the torque tubes.

Figure 5:
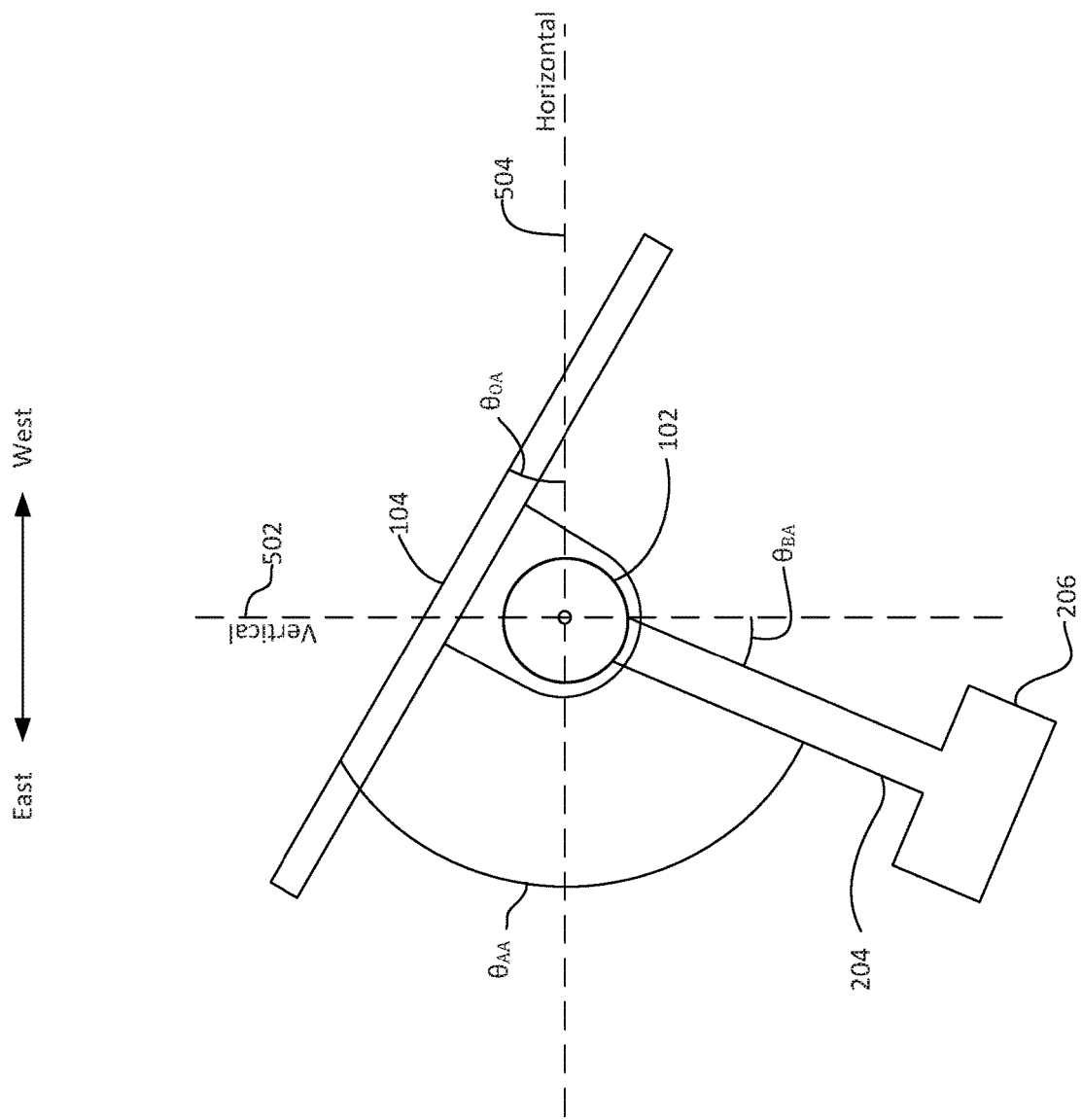
FIG. 5 shows a schematic side view representation of a section of a photovoltaic array according to embodiments of the invention.

FIG. 5 shows a side schematic view of PV module 104, torque tube 102 and ballast arm assembly 200. The schematic further includes indications of vertical axis 502 and horizontal axis 504. As used herein the angle between the PV module surface and longitudinal axis of arm 204 is referred to as the adjustment angle, $\theta_{AA}$. The angle of PV module surface relative to ground is referred to as the orientation angle, $\theta_{OA}$. As used herein, with the North-South row orientation naming convention discussed above, an acute adjustment angle indicates that the arm is closer to east side of the PV module, and an obtuse adjustment angle indicates arm is closer to west side of PV module. Further, a negative orientation angle indicates that the PV module upper surface is facing generally eastward, and a positive orientation angle indicates that the PV module upper surface is facing generally westward.

As noted above, drive mechanism 202 changes the angle between torque tube 102 and arm 204 and can therefore be used to set the adjustment angle. As shown in FIG. 2, PV modules 104 are offset from the axis of rotation of torque tube and therefore include a center of gravity an offset distance from the axis of rotation of torque tube 102. Further, ballast arm assembly 200 has a center of gravity offset from axis of rotations of torque tube 102. Therefore, both PV modules 104 and ballast arm assemblies 200 impart moments on torque tube 104. Due to the support structure allowing free rotation of torque tube 102, torque tube 102 will rotate to a point of equilibrium where the moments applied to torque tube 102 are balanced. In a simple example, without environment factors, the balancing moments are the moment of PV modules and the moment of the ballast arm assemblies.

Changing the adjustment angle causes the centers of gravity of the PV modules and ballast arm assemblies to move relative to one another. This change of position of centers of gravity causes the moments on the torque tube caused by the PV modules and ballast arm assemblies to change. If the moments were previously balanced, then the change of adjustment angle causes the moments to be out of balance. As a result, the torque tube will rotate to a new point of equilibrium where the moments of the PV modules and ballast arm assemblies are balanced resulting in the PV modules being positioned at a different orientation angle. Therefore, changing the adjustment angle can be used to change the orientation angle.

The adjustment angle necessary to achieve a desired orientation angle can be calculated by determining the moment caused by PV modules at the desired orientation angle. In order to achieve the desired orientation angle, the dead load moment must be counterbalanced by the moment of the ballast arm assemblies.

The dead load moment $M_{DL}$ for a desired orientation angle is determined using the mass of each PV module $Mass_{PV}$, the number of PV modules N on the torque tube, the offset of the center of gravity of the PV modules from axis of rotation of torque tube $Offset_{PV}$, and the desired orientation angle $\theta_{OA}$. The following equation may be used to calculate the dead load mass.

$$M_{DL} = Mass_{PV} \times N \times Offset_{PV} \times \sin(\theta_{OA}) \qquad \text{Equation 1:}$$

As evidenced by equation 1, because PV modules are mounted to torque tube in a balanced manner the dead load moment is zero when in PV modules are stowed in the 0 degree orientation.

To achieve the desired orientation angle the moment generated by the ballast arm assemblies $M_{BA}$ must counter the moment generated by the PV modules. Therefore, the following equation must be satisfied.

$$M_{BA} + M_{DL} = 0 \qquad \text{Equation 2:}$$

The moment generated by the ballast arm assemblies is determined by the mass of each ballast arm assembly $Mass_{BA}$, the number of ballast arm assemblies $N_{BA}$ on the torque tube, the offset of the center of gravity of ballast arm assemblies from the axis of rotation of torque tube $Offset_{BA}$, and the angle of the ballast arm assemblies relative to gravity $\theta_{BA}$. The following equation may be used to determine the moment of the ballast arm assembly:

$$M_{BA} = Mass_{BA} \times N_{BA} \times Offset_{BA} \times \sin(\theta_{BA}) \qquad \text{Equation 3:}$$

With the physical properties of the ballast arm assembly being set, the required angle of the ballast arm assemblies relative to gravity $\theta_{BA}$ can be determined with the following equation.

$$\sin^{-1} \frac{M_{BA}}{Mass_{BA} \times N_{BA} \times Offset_{BA}} = \theta_{BA} \qquad \text{Equation 4}$$

To achieve the determined required angle of ballast arm assemblies relative to gravity $\theta_{BA}$ the adjustment angle $\theta_{BA}$ can be calculated with the following equation.

$$\theta_{AA} = \theta_{OA} - \theta_{BA} + 90 \qquad \text{Equation 5:}$$

The drive mechanism can be used to rotate the rotation arm to the calculated adjustment angle for the desired orientation angle and the resulting moments caused by the PV modules and ballast arm assemblies will cause torque tube to rotate to a point of equilibrium with PV modules oriented at the desired orientation angle.

Equation 2 above is for static balancing of PV modules and ballast arm assemblies. During use, an additional moment, $M_E$ caused by environmental conditions, such as wind, will likely also be applied to the torque tube. Therefore, in embodiments, the following equation may be used when balancing moments to determine the required adjustment angle to achieve the desired orientation angle.

$$M_{BA} + M_{DL} + M_E = 0 \qquad \text{Equation 6:}$$

Additional moment, $M_E$, caused by environmental conditions can be measured using sensors, or calculated based on measured environment conditions, for example wind velocity.

Using the above equations, required adjustment angles necessary to achieve various desired orientation angles, under various environmental conditions, may be calculated.

Figure 6A:
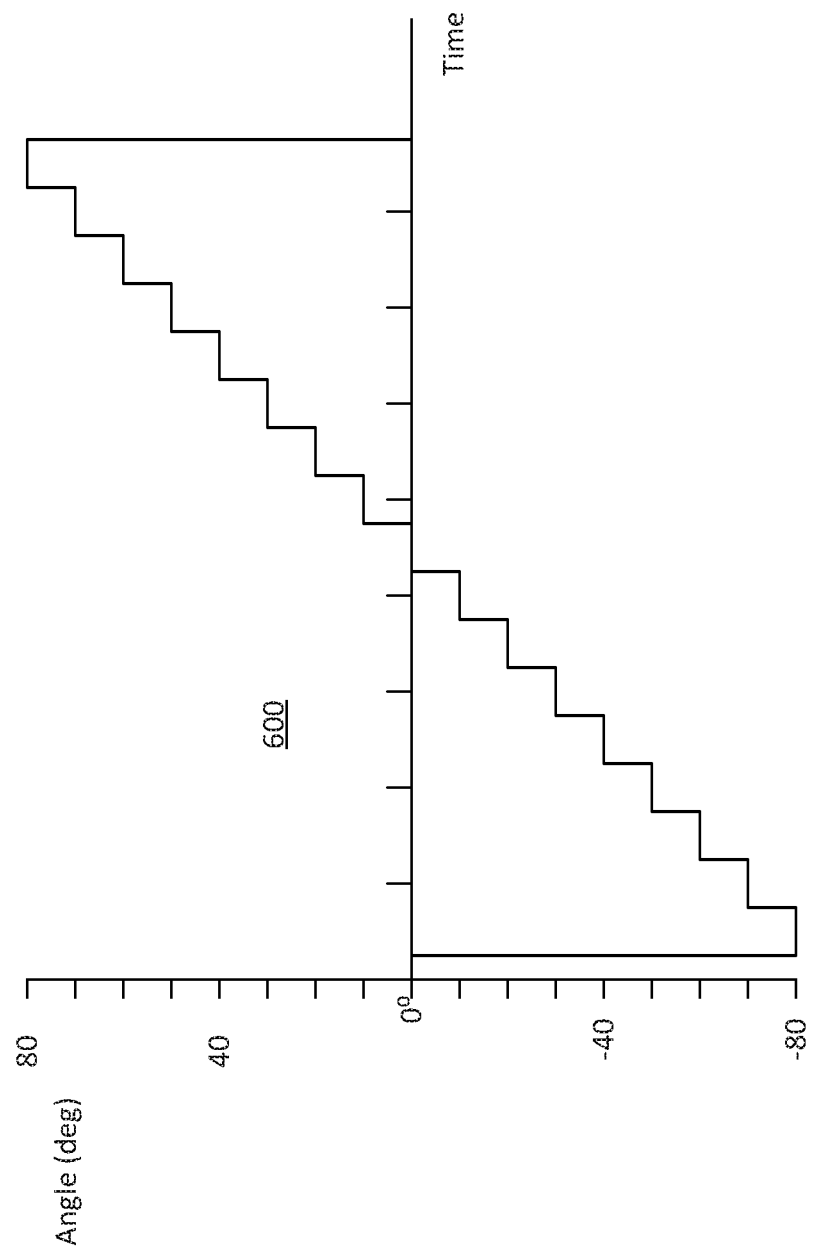
FIGS. 6A-B show charts of exemplary routines for changing orientation angle over the course of a day according to embodiments of the invention.
Figure 6B:
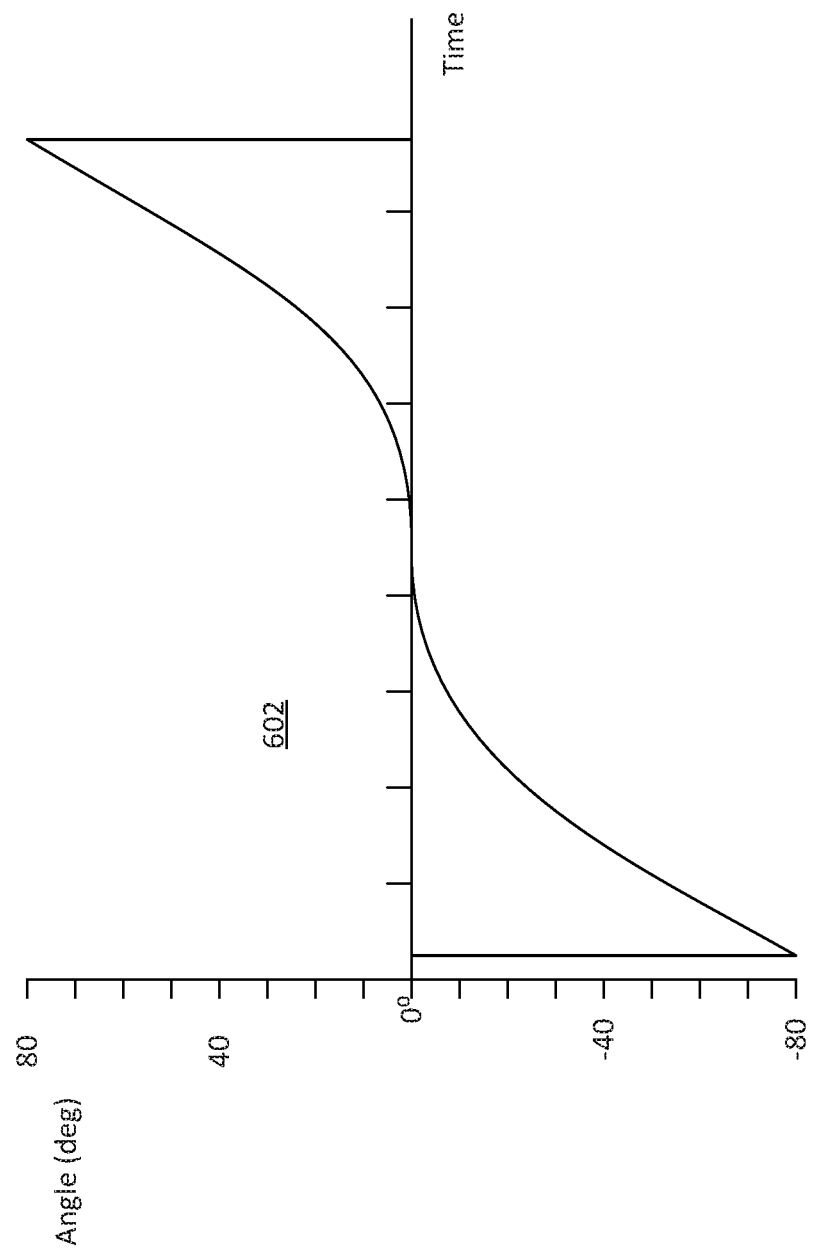

Tracking the sun with PV modules can be accomplished by changing the adjustment angle in small increments to rotate the arm relative to the torque tube in small increments to optimal orientation angles for the latitude, time of year, and time of day. The optimal orientation angle can be determined by referencing a look-up table giving sun position data throughout the day for a known latitude. The increments for orientation angle can be based on an orientation angle routine. FIGS. 6A and 6B show graphs 600 and 602 including embodiments of an orientation angle routine for one day. The left sides of these graphs represent sunrise and the right sides represent sunset. An orientation angle of zero degrees represents PV modules being oriented directly upwards, in the stowed position. As shown, PV modules are positioned in the stowed position during night hours to reduce the possibility of winds stressing the torque tube and PV modules during the evening hours. As shown, around sunrise the routines begin and the orientation angle is set from 0-degrees to about 80-degrees, which is an angle optimized for collecting sunlight during sunrise. As shown in FIG. 6A, throughout the day, the orientation angle is changed to account for relative movement of the sun in a stepwise fashion. As shown in FIG. 6B, in some embodiments, the routine may be step-less and include continuous changing of the orientation angle throughout the day to achieve even higher accuracy tracking and thus optimize energy generation. As shown in FIGS. 6A and 6B, around sunset the routines end and the orientation angle is set from about 80-degrees, which is an angle optimized for collecting sunlight during sunset, back to 0-degrees for stowing during night hours. In embodiments, the range of angles may vary based upon factors such as row spacing in the array, among other possible factors. In embodiments that include changing the orientation angle in a stepwise fashion, there may be any number of steps throughout the day. Further, in embodiments, the duration of each step may be uniform or may be different than other steps. Further, in embodiments, the number of degrees in each step may be of any amount and may be uniform or variable throughout the day.

To achieve the desired orientation angles of a routine, the required adjustment angle can be calculated using the equations above and all adjustment motors of a torque tube can be set to the required adjustment angles. The calculations may be performed prior to implementing a routine or during the routine. A controller can use a look-up table to determine the required adjustment angle for a desired orientation angle in a specific environmental condition. For example, the look-up table may include an entry for 30-degrees East and include adjustment angles for 0-5 mph wind, 5-15 mph wind, and 15-25 mph wind. Alternatively in embodiments, a controller may use an algorithm that takes as input wind speed and direction, and desired orientation angle, and calculates the required adjustment angle.

In embodiments, the environmental condition used to determine the required adjustment angle may be based on forecasted weather, live weather from remote sources (e.g. radar or satellite), or live conditions based on sensors on the array. For example, prior to initiating a daily routine, a routine of adjustment angles may be determined based on a routine of desired orientation angles and forecasted wind for different periods of the day. Further, during the routine, the controller may at any time recalculate the required adjustment angle based on live weather data, for example, from a weather satellite or radar and or based on live data from the array. For example, the controller may receive input from a wind vane and anemometer. Additionally, the controller may receive input from a device that measures actual orientation angle using visual methods, mercury switches, or inclinometers. In some embodiments, one or more sensors could be used to gather information about wind conditions and oscillatory motion of the torque tube. For example, accelerometers, strain gauges, pressure gauges and inclinometers mounted to the photovoltaic array can provide indications regarding conditions being experienced by PV modules of the array in real time. For example, pressure sensors can be operative to measure any prevailing wind shear effects by characterizing the instantaneous wind speed.

In embodiments, based on any of the methods above regarding environmental conditions, the controller may return PV modules to the stowed position to prevent damage to array.

In embodiments, the actual orientation angle of the PV modules may be measured at any time and compared to the desired orientation angle. If there is a deviation, for example caused by a changing wind condition, the adjustment angle may be changed in order to achieve the current desired orientation angle of PV modules. In embodiments, when changing the adjustment angle, the orientation angle may be monitored using any of the technologies disclosed herein and the adjustment angle will continue to be changed until the desired orientation angle is reached.

A benefit of the current system is its ability to self-balance. For example, the moment caused by environmental factors may change causing a net moment on the torque tube, causing torque tube to rotate. As the torque tube rotates, the actual orientation angle changes from the desired orientation angle to a different orientation angle, and the actual ballast arm angle changes from the required ballast arm angle to a different ballast arm angle. The changing of these angles changes the moments applied to the torque tube. As long as these moments do not balance, the torque tube will rotate, which in turn changes the moments until a new point of equilibrium with a net zero moment is achieved.

For example, PV modules may be set at a first orientation angle with a first environmental condition. The environmental condition changes, for example the wind speed increase, and this causes PV modules to rotate to an increasingly vertical orientation angle. Because the adjustment angle is fixed by the drive mechanism, this increasingly vertical orientation angle causes the ballast arm assembly to rotate toward an increasingly horizontal orientation. The more horizontal orientation causes the moment of the ballast arm assembly to increase and counter the moment caused by environmental conditions, therefore stopping rotation of torque tube. If this new self-balancing point of equilibrium results in an actual orientation angle that is outside of a predetermined range of allowable variation from the desired orientation angle, the controller will determine the new required adjustment angle to achieve the desired orientation angle under the new conditions, and will cause the drive mechanism to change the new adjustment angle. Therefore, because of this ability to self-balance, the array is able to passively respond to varying wind conditions.

Figure 7:
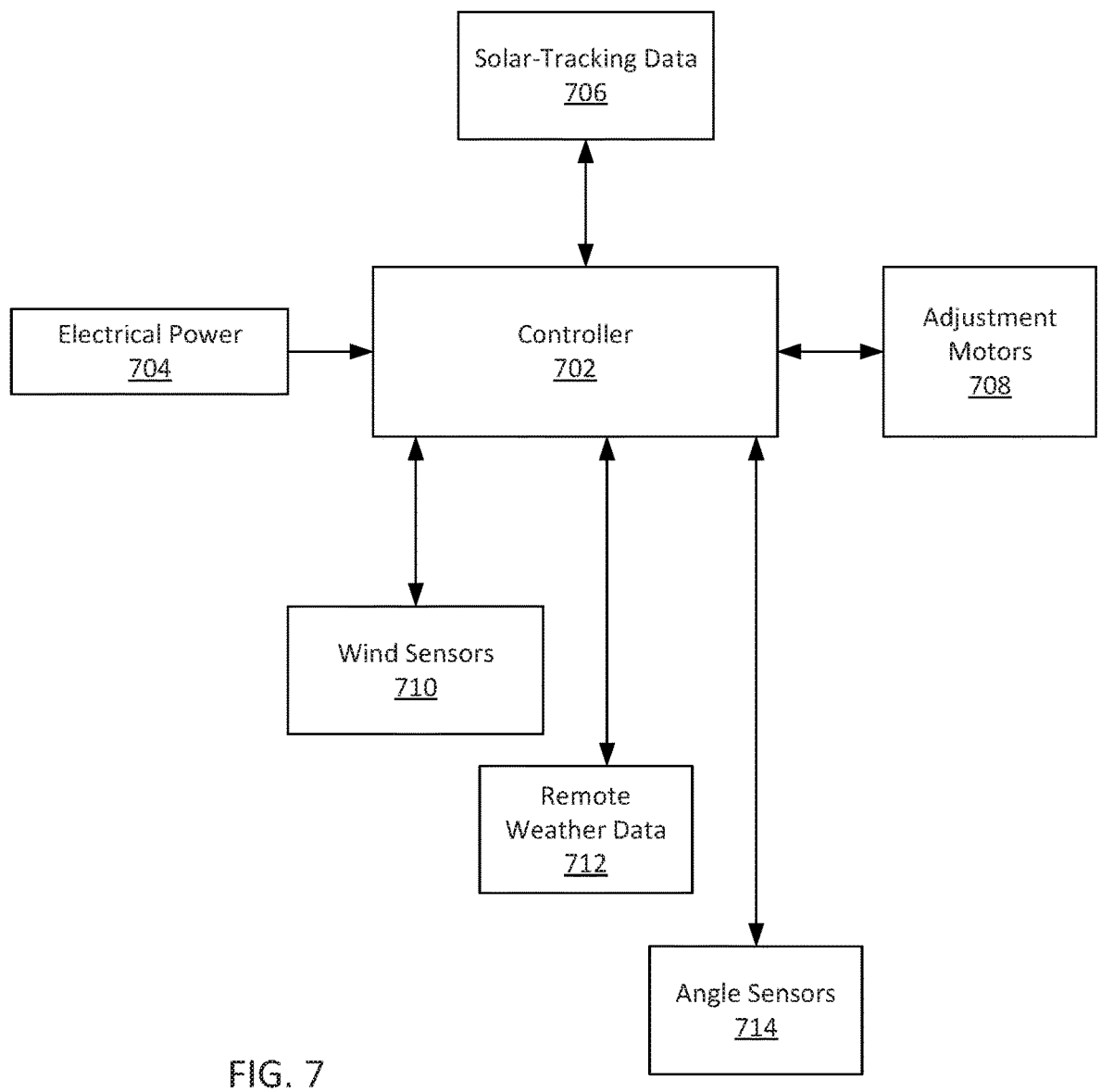
FIG. 7 shows a schematic of a control system of a solar-tracking photovoltaic array according to embodiments of the invention.

FIG. 7 shows a block diagram showing a control scheme for rotating photovoltaic array 100 in accordance with a sun-tracking algorithm. Controller 702 is shown and includes at least the following inputs: electrical power 704 and solar-tracking data 706. Since controller 702 is in receipt of power from electrical power 704, controller 702 can be responsible for distributing that power to other components of photovoltaic array 100. In particular, controller 702 can allow energy from electrical power 704 to energize adjustment motors 708 as discussed above to change adjustment angle in order to achieve a desired orientation angle. As noted above, controller 702 may receive data from one or more sources in order to determine the required adjustment angle to achieve the desired orientation angle. As shown, the one or more sources may include wind sensors 710, remote weather data 712, and angle sensors 714.

In embodiments, the controller may control the ballast arm assemblies of each row or segment of torque tube in unison or independently. Because ballast arm assemblies may be continually spaced along the torque tube of a row the technology disclosed herein allows for unlimited row length, because with proper spacing of ballast arm assemblies, additional torque tube length does not add more stress to the torque tube.

As noted, the control methodologies described herein can be implemented in a system having one, two or more adjustment motors on single torque tubes. In some embodiments, based on the arrangement of the array, different torque tubes in the array may be exposed to different environmental conditions, for example due to shielding of adjacent rows or geographical or manmade features. Particularly, the outside rows may experience higher winds than rows in between other rows. Therefore in embodiments, rows determined to be likely to experience relatively higher winds than other rows may have heavier ballasts, more ballast arm assemblies, and/or heavier duty adjustment motors than other rows in the array. Further, in embodiments, adjustment angles may be set differently in different rows, or in different portions of rows including independent torque tube sections, in order to achieve the same orientation angle from row to row.

Further, due to the length of rows in the array, different sections of torque tube may experience different wind conditions causing different moments. Therefore, in embodiments, the torque tube may include ballast arm assemblies set to different adjustment angles in order to balance moments and stresses of the torque tube.

Components of the ballast arm assembly and torque tube as disclosed herein can be constructed from materials appropriate for use with photovoltaic arrays and PV modules. Accordingly, components of the arm assembly can be constructed from lightweight construction materials including, but not limited to, stainless steel, aluminum, titanium, other metals, and alloys or intermetallics thereof.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A photovoltaic tracker array section, comprising:
    a torque tube freely rotatably attached to a support structure;
    a first photovoltaic module mounted to the torque tube with a bracket such that the first photovoltaic module and the torque tube are configured to rotate together; and
    a ballast arm assembly directly mounted to and suspended from the torque tube, the ballast arm assembly comprising:
        an arm portion;
        a ballast at a first end of the arm portion; and
        a drive mechanism at a second end of the arm portion, wherein the drive mechanism is configured to rotate the arm portion and the ballast relative to the torque tube and the first photovoltaic module with a motor in order to change an adjustment angle between the arm portion and the first photovoltaic module from a first adjustment angle to a second adjustment angle in order to cause the torque tube to freely rotate relative to the support structure in order to balance moments on the torque tube caused by the ballast arm assembly and the first photovoltaic module so that an orientation angle of the first photovoltaic module relative to the support structure changes from a first orientation angle to a second orientation angle.

2. The photovoltaic tracker array section of claim 1, further comprising a worm wheel directly affixed around the torque tube, and wherein the drive mechanism comprises a worm screw affixed to the motor with an axis of rotation perpendicular to an axis of rotation of the torque tube, wherein the motor is affixed to the arm portion, wherein the motor is configured to rotate the worm screw so that the worm screw engages with the worm wheel to rotate the arm portion, the ballast and the motor relative to the torque tube and so that the arm portion, the ballast and the motor rotate around the axis of rotation of the torque tube relative to the support structure.

3. The photovoltaic tracker array section of claim 1, wherein the drive mechanism is configured to change the orientation angle over a range of at least 90 degrees.

4. The photovoltaic tracker array section of claim 1, wherein changing the adjustment angle N degrees causes the orientation angle to change M degrees, different than N degrees.

5. The photovoltaic tracker array section of claim 1, wherein the ballast arm assembly has a center of gravity a first distance from an axis of rotation of the torque tube and the first photovoltaic module has a center of gravity a second distance, less than the first distance, from the axis of rotation of the torque tube.

6. The photovoltaic tracker array section of claim 1, wherein the support structure supports the torque tube above a ground surface by a first distance, and wherein the arm portion has a length greater than 50% of the first distance.

7. The photovoltaic tracker array section of claim 1, further comprising a controller;
    wherein the controller is configured to determine a required adjustment angle to achieve a set orientation angle of the first photovoltaic module and actuate the drive mechanism to change the adjustment angle to the required adjustment angle.

8. The photovoltaic tracker array section of claim 7, wherein the controller determines the required adjustment angle based on wind velocity determined with wind sensors.

9. The photovoltaic tracker array section of claim 7, further comprising an angle sensor, wherein the controller uses a measured orientation angle of the first photovoltaic module measured with the angle sensor to determine the required adjustment angle.

10. The photovoltaic tracker array section of claim 7, wherein the ballast arm assembly is a first ballast arm assembly and wherein the photovoltaic tracker array section further comprises a second ballast arm assembly directly mounted to and suspended from the torque tube, the second ballast arm assembly comprising:
 a second arm portion;
 a second ballast at a first end of the second arm portion; and
 a second drive mechanism at a second end of the second arm portion, wherein the second drive mechanism is configured to rotate the second arm portion and the second ballast relative to the torque tube and the first photovoltaic module with a second motor in order to change an adjustment angle of the second ballast arm assembly between the second arm portion and the first photovoltaic module from a third adjustment angle to a fourth adjustment angle in order to cause the torque tube to freely rotate relative to the support structure in order to balance moments on the torque tube caused by the second ballast arm assembly, the first ballast arm assembly and the first photovoltaic module; wherein the controller is configured to actuate the first and the second ballast arm assemblies to change the adjustment angles of the first ballast arm assembly and the second ballast arm assembly to the required adjustment angle.

11. The photovoltaic tracker array section of claim 7, wherein the controller is configured to change the adjustment angle over the course of a span of time in order to change the orientation angle according to a predetermined routine of orientation angles.

12. The photovoltaic tracker array section of claim 1, wherein the support structure comprises bearings configured so that changing wind conditions cause the orientation angle to change with the adjustment angle remaining constant.

* * * * *